United States Patent [19]

Foster et al.

[11] Patent Number: 5,446,819
[45] Date of Patent: Aug. 29, 1995

[54] TERMINATION TOOL AND METHOD FOR OPTICAL FIBRE CABLES

[75] Inventors: Nigel S. Foster, Southampton; David P. Murray, Nr. Winchester, both of United Kingdom

[73] Assignee: ITT Industries, Inc., New York, N.Y.

[21] Appl. No.: 274,878

[22] Filed: Jul. 14, 1994

[51] Int. Cl.$^6$ .............................................. G02B 6/36
[52] U.S. Cl. ........................................ 385/80; 81/488; 219/221; 219/543
[58] Field of Search ................ 385/53, 55, 56, 76–78, 385/80, 81, 84, 85; 269/2, 329, 900, 903; 219/85.16, 221, 227, 229, 241, 543; 81/487, 488; 451/365

[56] References Cited

U.S. PATENT DOCUMENTS

| | | | |
|---|---|---|---|
| 4,116,655 | 9/1978 | Lewis | 385/84 X |
| 4,315,128 | 2/1982 | Matcovich et al. | 219/229 X |
| 4,330,965 | 5/1982 | Clark | 451/365 |
| 4,588,256 | 5/1986 | Onstott et al. | 350/96.21 |
| 4,634,214 | 1/1987 | Cannon, Jr. et al. | 350/96.2 |
| 4,713,523 | 12/1987 | MacDonald | 219/385 |
| 4,790,622 | 12/1988 | Levinson et al. | 350/96.2 |
| 4,938,558 | 7/1990 | Miller et al. | 350/96.2 |
| 4,984,865 | 1/1991 | Lee et al. | 350/96.2 |
| 5,031,981 | 7/1991 | Peterson | 385/56 |
| 5,074,021 | 12/1991 | Feng et al. | 269/903 X |

FOREIGN PATENT DOCUMENTS 0434212  6/1991  European Pat. Off. .

Primary Examiner—John D. Lee
Attorney, Agent, or Firm—Thomas L. Peterson

[57] ABSTRACT

An optical fibre cable terminating tool (16) and method for terminating a cable to a connector (13) of the type having at one end a ferrule (14) provided with a meltable adhesive therein. The tool (16) has a recess 16a for receiving and locating a connector (13) with its ferrule end projecting from the recess and permitting the end to be inserted into a heating recess of an oven. A heat sensitive element (36) is provided on the tool spaced from the recess end and this displays a change in appearance at a predetermined temperature which is indicative of a higher temperature at the ferrule at which higher temperature the adhesive is molten.

19 Claims, 5 Drawing Sheets

FIG. 1
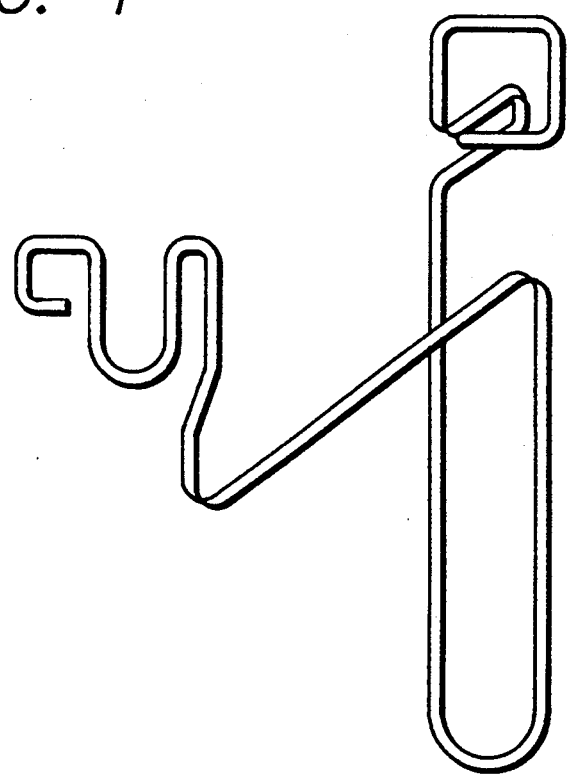
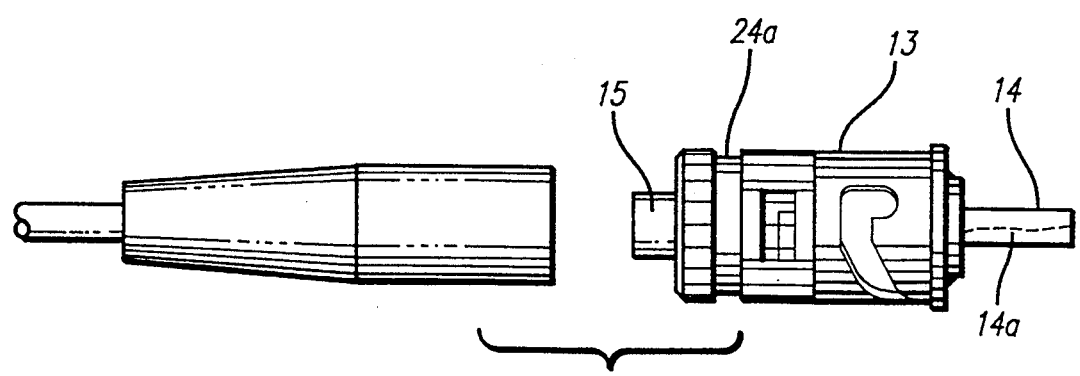
FIG. 2

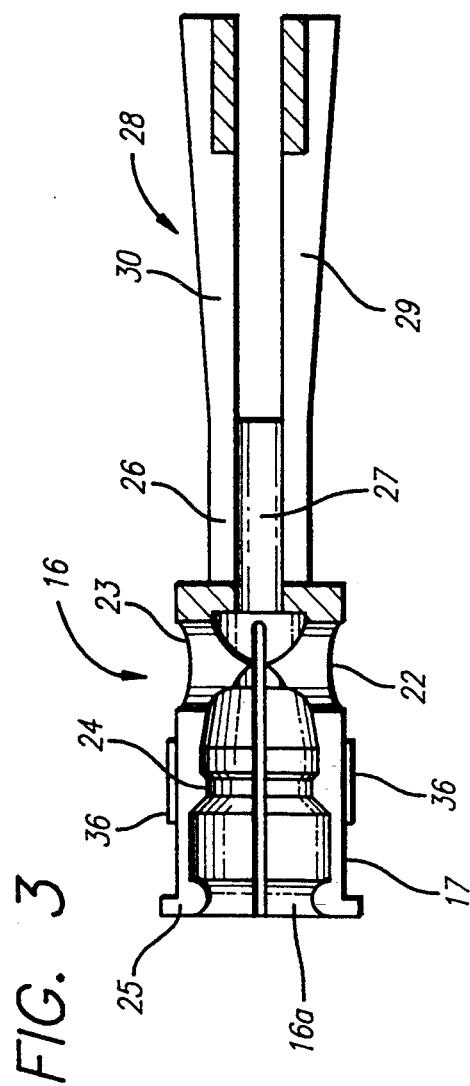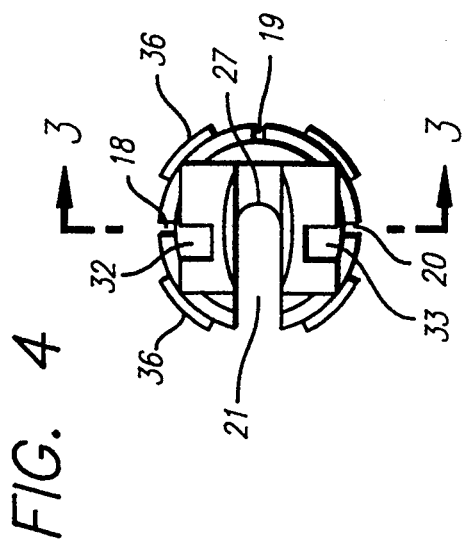
FIG. 3    FIG. 4
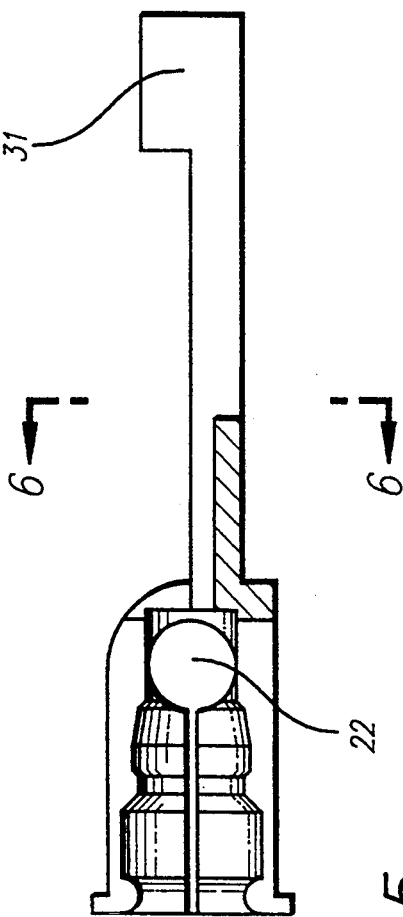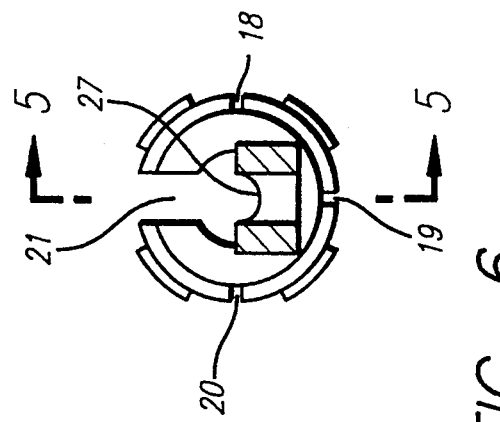
FIG. 5    FIG. 6

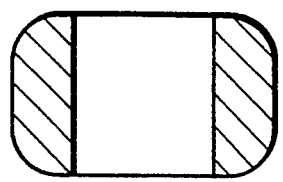
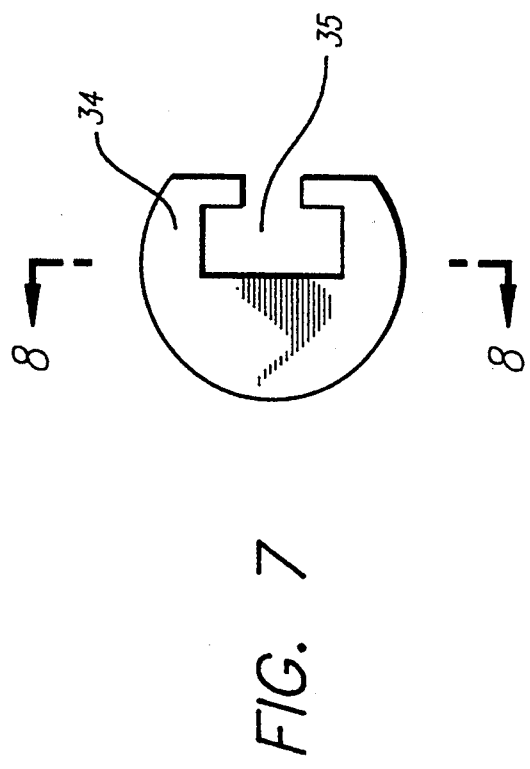
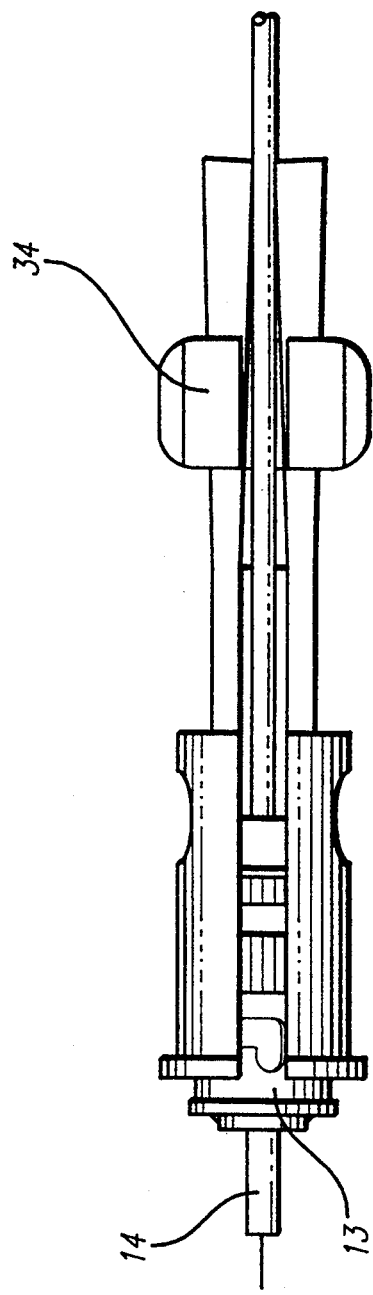

TERMINATION TOOL AND METHOD FOR OPTICAL FIBRE CABLES

BACKGROUND OF THE INVENTION

This invention relates to the termination of an optical fibre with a connector so as to permit the cable to be connected to an optical circuit or device.

DESCRIPTION OF THE PRIOR ART

An optical fibre cable normally comprises an optical fibre provided with strength member in the form of a reinforcing sheath of for example KEVLAR and an outer protective jacket. The jacket and KEVLAR sheath have to be stripped back to expose the end of the fibre for termination. The terminating operation normally involves the fitting over the protective jacket of a boot of the connector followed by a crimp sleeve prior to stripping back the sheath and jacket at the end of the cable. The connector has a central tubular ceramic ferrule secure at one end in a tubular metal ferrule holder. The ferrule is for receipt of the optical fibre and this is securable therein by means of an adhesive. The adhesive employed may be an epoxy resin which is introduced into the tubular ceramic portion prior to the introduction of the optical fibre which is then pushed through the metal ferrule holder and through the ferrule until the sheath and jacket abut the tubular ceramic portion at which point the fibre extends through and beyond the other end of the tubular ceramic portion. The crimp sleeve is then slid over the outer jacket and over the metal ferrule holder and crimped to secure the cable to the ferrule holder and the boot is slid down over the ferrule holder. The connector is then placed in a curing oven at 130° C. to set the adhesive following which the projecting optical fibre is cleaved and polished.

Recently, it has become known to us that instead of employing an epoxy resin, a meltable adhesive can be employed for example a polyamide adhesive. This can lead to a simplification of the termination process by the inclusion of a pre-melted volume of adhesive in the ferrule and ferrule holder of the connector for re-melting prior to introduction of the cable/fibre. In addition the crimping sleeve is not required because the protective jacket and cable strength member are secured by adhesive in the ferrule holder. In order to carry out this termination a holder for the connector is required which can be used to place the connector in an oven to preheat the adhesive prior to termination of the cable. One way of doing this is to employ a wire cradle of roughly "Y" shaped configuration such as is illustrated in FIG. 1. The cradle has one arm 10 for carrying a metal block (not shown) in which the ferrule end of the connector body is housed. Such a connector body is shown in FIG. 2. The other arm 11 has a clip arrangement for securing the cable to be terminated. In use the arm 10, with the metal block and connector body 13 therein, is inserted into an oven for sufficient time to permit the temperature to be raised to above the melting point of the adhesive 14a e.g. 200° C., the cradle is then removed and the prestripped optical fibre cable is introduced thereto. The optical fibre is passed through a ferrule 14 of the connector and the sheath and reinforcing portion is bottomed in a ferrule holder 15. The cable is clipped on the arm 11 so that the cable is held in position during cooling and setting of the adhesive. Whilst this arrangement does permit termination of the optical fibre cable it does have several disadvantageous aspects. Firstly there is uncertainty as to when the connector temperature has been raised to the required level to ensure that the adhesive has melted, secondly there is uncertainty when the connected has cooled to a temperature at which setting of the adhesive has occurred and the connector is cool enough to handle to permit release from the cradle, thirdly the clamping of the cable is by no means positive, fourthly the cradle is difficult to secure when in position with the connector inserted into the oven and fifthly, because the metal block, used to secure the connector in the cradle, shrouds the ferrule end, difficulty is experienced when trying to observe if the fibre has penetrated through the end of the ferrule.

BRIEF SUMMARY OF THE INVENTION

The present invention seeks to provide an optical fibre cable terminating tool and method of termination in which one or more of the before mentioned disadvantages are overcome or at least substantially reduced.

According to one aspect of the invention there is provided an optical fibre cable terminating tool for terminating a cable to a connector, having at one end a ferrule provided with a meltable adhesive therein, the tool comprising a recess for receiving and locating the connector with its ferrule end projecting from the recess and permitting the end to be inserted into a heating recess of an oven, a heat sensitive element provided on the tool spaced from the recess end, which element displays a change in appearance at a predetermined temperature which is indicative of a higher temperature at the ferrule at which higher temperature the adhesive is molten.

The tool may be designed to have heat insulative properties and the heat sensitive element may be positioned at a pre-determined distance from the recess end so that it displays a change in appearance after a predetermined time from insertion of the recess end into the oven, which change in appearance is indicative of a higher temperature at the ferrule, at which higher temperature the adhesive is molten.

The tool may be moulded from a plastics material thereby to provide a significant temperature differential between ferrule and the heat sensitive element.

According to a second aspect of the invention there is provided an optical fibre cable terminating tool comprising an elongate body provided at one end with a through recess shaped to receive and locate a connector, having at one end a ferrule, with the ferrule end projecting from the recess, which body is provided with an outwardly directed flange which serves to permit the projecting connector to enter a heating aperture of an oven but prevent the tool from entering the oven.

According to a third aspect of the invention there is provided an optical fibre cable terminating tool comprising an elongate body provided at one end with a through recess shaped to receive and locate a connector, having at one end a ferrule, with the ferrule end projecting from the recess, which body is provided with a pair of resilient legs extending divergently one on each side of an axis through the centre of the recess, a slider provided on the legs which cooperates with the divergent surfaces of the legs to cause their extremities to be urged towards each other upon movement of the slider towards the remote end of the legs thereby to permit clamping of a cable between said extremities.

This clamping of the cable minimises the risk of relative movement between cable and connector during the setting of the adhesive and ensures proper termination.

According to a fourth aspect of the invention there is provided a method of terminating an optical fibre cable comprising the steps of:

(a) stripping the covering from the cable end to expose the fibre for termination, (b) mounting a connector, having a ferrule containing a meltable adhesive for receipt of an optical fibre, in a recess in a tool such that the ferrule end projects therefrom, (c) using the tool to insert the ferrule end into a heating aperture of an oven and allowing the ferrule end to be heated, (d) watching for a change of appearance of a heat sensitive region on the tool, which is responsive to conductive heat, to indicate when the ferrule temperature has exceeded the melting point of the adhesive, (e) using the tool to remove the ferrule end from the oven and inserting the stripped optical fibre end into the ferrule until its extremity emerges at the remote end of the ferrule, (f) allowing the connector and tool to cool, (g) removing the connector from the tool.

BRIEF DESCRIPTION OF THE DRAWINGS

In order that the invention and its various other preferred features may be understood more easily, a prior art construction, some constructions in accordance with the invention and a method in accordance with the invention will now be described, by way of example only, with reference to the drawings in which:

FIG. 1 is a sketch of an optical fibre terminating tool of a type already known to us and as previously described, FIG. 2 is a side view of a connector and its boot for terminating an optical fibre cable, FIG. 3 is a longitudinal axial cross sectional view of an optical fibre cable terminating tool constructed in accordance with the invention with its clamping slider removed, FIG. 4 is an end view of the holder of FIG. 3 viewed from the right, FIG. 5 is a longitudinal axial cross sectional view taken along a plane at right angles to that of FIG. 3, FIG. 6 is a cross sectional view taken along the line A—A of the holder shown in FIG. 5, FIG. 7 is a side view of a slider part of the tool of FIGS. 3 to 6, FIG. 8 is a cross sectional view taken along the line B—B of the slider of FIG. 7, FIG. 9 is a side view of the tool of FIGS. 3 to 6, showing a connector and cable therein and with the slider in position in the clamped state.

Figure 10:
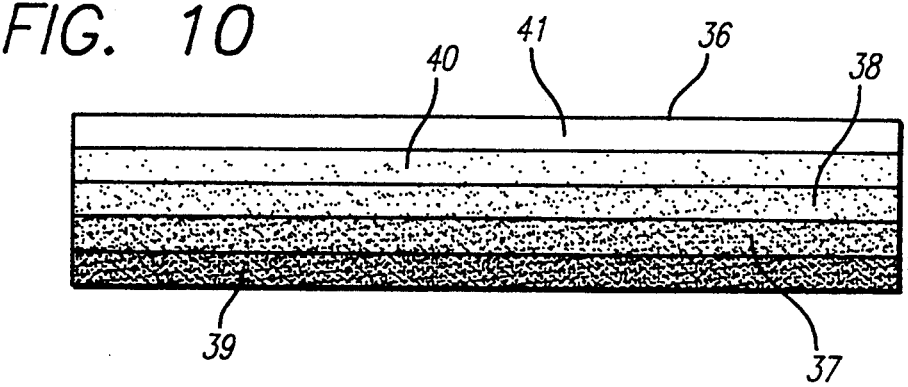
FIG. 10 is a cross sectional view of a heat sensitive pad as used in the tool of FIGS. 3 to 6.

Referring to the drawings of FIGS. 3 to 6 there is illustrated an optical fibre cable terminating tool which is moulded from a high melting point plastics material for example poly ether sulphone (P.E.S.) which has a melting point of about 280° C. The tool comprises a body 16 which has one end 17, the left hand end as illustrated in the drawings, of roughly cylindrical form with an inner surface conforming substantially to the outer shape of the connector illustrated in FIG. 2. The end defines a recess 16a. The end 17 is provided with four longitudinally extending radial slots 18,19,20,21 disposed equidistantly around the cylindrical end and extending for a major part of the length of the end 17. The slots 18,19,20 are narrow slots and the slot 21 is a wider slot. The slots 18 & 20 end at circular inspection holes 22, 23 through the wall of the cylinder remote from the outer end. The conformity of the inner surface of the cylindrical end to the outer shape of the connector in particular includes an inwardly extending circumferential projection 24 which cooperates with a peripheral recess 24a in the connector (FIG. 2). The cylindrical end 17 is resilient by virtue of the slots 18–21 and permits the connector to be inserted until latching cooperation occurs between the projection 24 and recess 24a. The extremity of the left hand end 17 has a radially outwardly projecting flange 25. The left hand end 17 of the body 16 adjoins a central elongate part 26 of substantially rectangular cross section but having a top recess 27 of semi circular cross section of diameter equal to the width of the slot 21 and which forms a continuation of the slot. The central part 26 adjoins a right hand portion 28 consisting of two spaced legs 29, 30 which are of rectangular cross section and outwardly tapered relative to a central axis of the body 16. The legs are extensions of the central part 26 and are separated by the width of the recess 27 so that the gap therebetween forms a continuation of the recess. At the right hand end of the legs there is provided an enlargement 31 which extends in line with the inner face of the arm which is of the same width. The enlargement has outwardly facing rectangular grooves 32, 33 the bottom faces of which form a continuation of the top of the legs 30 & 29 respectively.

FIGS. 7 & 8 illustrate a collar 34 which is of part circular cross section the circular form being truncated by a chord to define a flat in which there is formed a groove 35 which has a "T" shaped configuration that conforms with the cross sectional shape of the right hand end of the legs 28,29, when resiliently flexed towards and into contact with each other. This permits the collar to be slid onto the body and along the legs and it becomes captive on the legs by virtue of the retentive effect of the enlargements 31 when the legs spring apart under their natural resilience. It will be appreciated that due to the outward taper of the legs 29 and 30, in a direction to the right as illustrated, the legs are caused to be moved towards each other as the collar is slid to the right.

The left hand end of the body is provided on its exterior surface with one or more pads 36 of heat sensitive material the appearance of which changes at a specific predetermined temperature. This temperature of the body relates to the temperature of the ferrule 14 which contains the meltable adhesive 14a, as illustrated in FIG. 2, and is intended to indicate both when the adhesive has melted and, by revertion to its original appearance, when the tool has cooled sufficiently, after setting of the adhesive, for it be handled. This aspect will be described in further detail during description of the method of terminating of the cable however the construction of a suitable thermal pad 36 for attachment to the body 16 is illustrated in FIG. 10. This is self adhesive and has a SERICOL standard "tack adhesive" 37 on a PVC or paper backing 38. The adhesive is protected by a silicon release paper 39. On the backing 38 there is provided a standard printing ink layer 40 which may provide a motif, wording or colour and on top of that there is provided a thermally sensitive ink layer 41 which is formulated to clear revertibly at a predetermined temperature, for example at 45°-50° C. Alternatively the pads can be formulated so as to change colour e.g. from blue to red. These pads are secured to the body 16 as can be seen in the drawings. A suitable pad is obtainable from B & H Crystal Devices Limited of London but pads which change at specific temperatures are well known for example in the manufacture of visual thermometers such as can be stuck to walls of rooms or aquariums.

The method of termination of the cable will now be described with reference to FIGS. 11 to 17 of the drawings.

Figure 12:
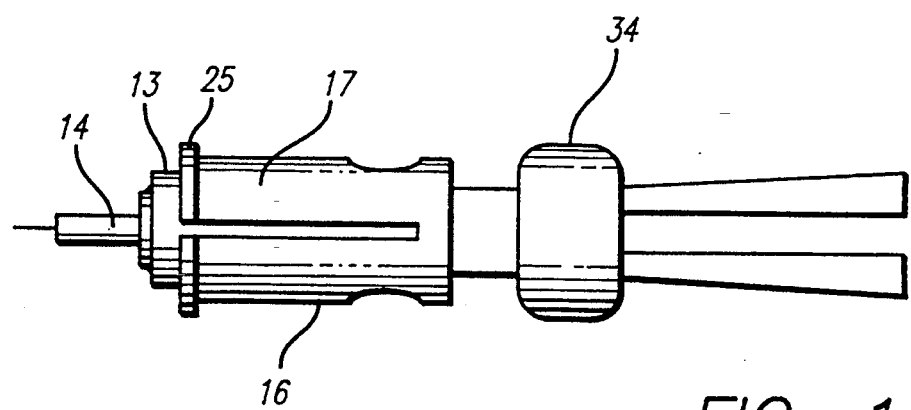
FIG. 12 is a side view of the optical fibre cable terminating tool with a connector located therein.
Figure 13:
FIG. 13 is a side view showing a connector boot mounted on an optical fibre cable.

The steps involved are as follows:

Step 1: The connector is located in the end 17 of the body 16 of the terminating tool as shown in FIG. 12.

Figure 11:
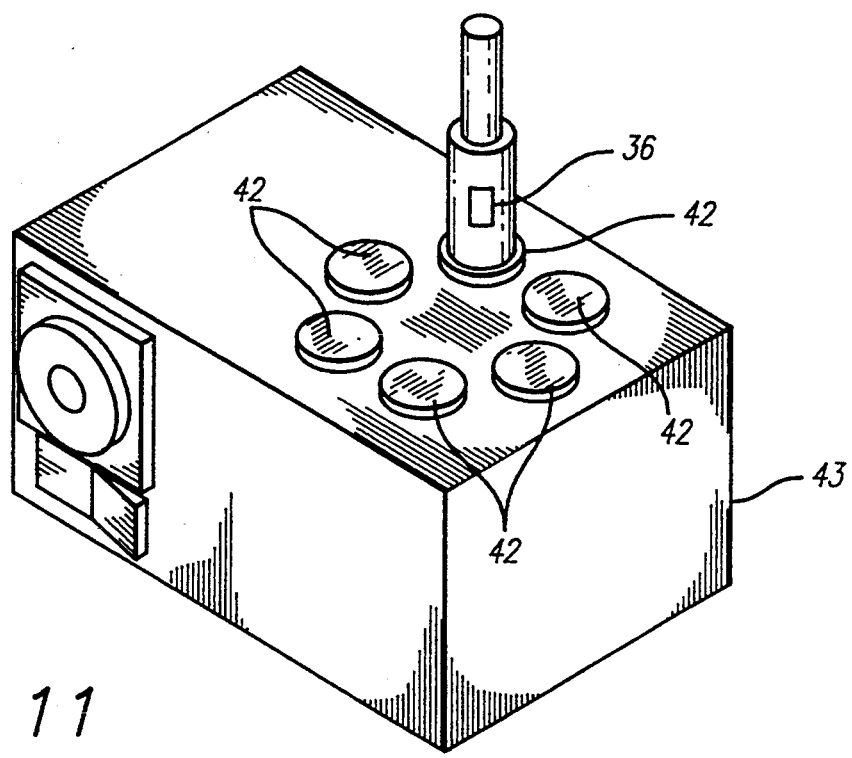
FIG. 11 is a perspective view of an oven for use in the method of the invention.

Step 2: The ferrule end of the connector where it projects from the body 16 is then inserted downwardly into one of a number of circular heating aperture 42 in the top of an oven 43 as shown in FIG. 11 and is supported ferrule down therein by the flange 25 of the tool which abuts the entrance to the aperture 42.

Step 3: The ferrule is heated in the oven during which heat is conducted to the body 16 of the terminating tool. The location of the pads 36 and the temperature at which they change in appearance are designed such that they change when the ferrule reaches the melting point of the remeltable adhesive contained in the ferrule bore. It will be appreciated that the temperature occurring at the pads will be substantially less than the temperature at the ferrule for example 45°-50° C. when the ferrule reaches 200° C. When the change in appearance of the pad occurs the connector is ready to terminate a cable.

Figure 14:
FIG. 14 shows the end of an optical fibre cable stripped ready for termination.

Step 4: The optical fibre cable is stripped ready for termination, as shown in FIG. 14, during or prior to the heating step 3.

Figure 15:
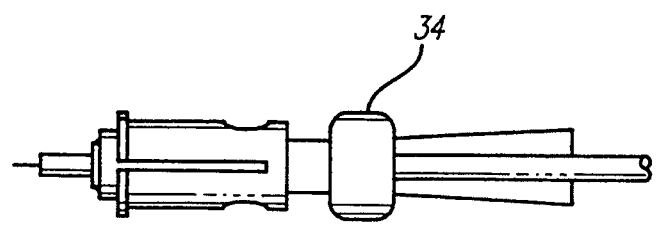
FIG. 15 shows the end of the cable illustrated in FIG. 14 inserted into the connector and terminating tool assembly of FIG. 12.
Figure 16:
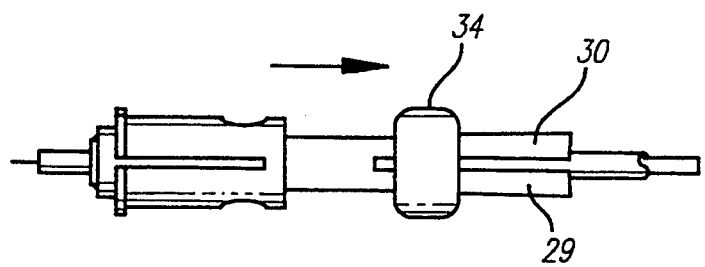
FIG. 16 illustrates clamping of the cable in the tool of FIG. 12.

Step 5: When the pads indicate that the connector temperature is right for termination the connector is removed from the oven by the tool. The optical fibre is then firmly but carefully inserted through the body of the connector until it emerges at the top of the ferrule 14. The cable is then pushed firmly home ensuring that the reinforcing sheath or strength member and jacket are fully inserted as can be viewed through the holes 22, 23, in the cylindrical end of the tool, twisting if necessary, and that the cable is straight, as shown in FIG. 15. The cable is moved backwards and forwards slightly to observe fibre movement at the tip of the ferrule to ensure that the fibre is not broken.

Step 6: The collar 34 is then moved in the direction of the arrow in FIG. 16 which causes the legs 29, 30 to clamp the cable.

Figure 17:
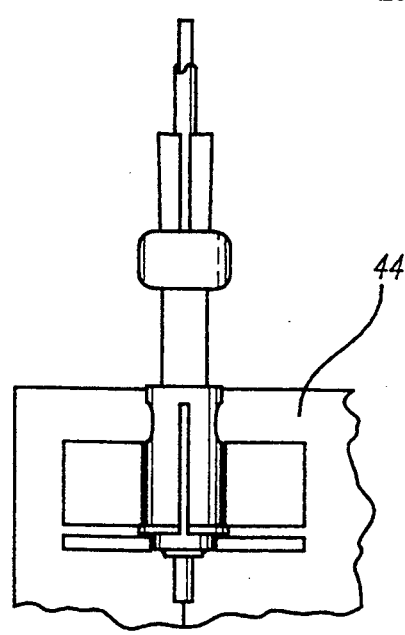
FIG. 17 shows the terminated cable and tool in a cooling rack.

Step 7: The tool with the connector and cable in place is then inserted into a cooling rack as shown in FIG. 17 until the pads revert to their original appearance which is indicative that the tool and connector has cooled to a temperature at which they can be handled and the adhesive had set to secure the optical fibre cable in the connector.

Step 8: The connector with the cable therein is removed from the tool by sliding the collar 34 in the opposite direction to that shown in FIG. 16 to release clamping pressure on the cable and the connector can then be removed sideways through the wider groove 21 due to resilience of the body of the tool.

Step 9: The portion of the optical fibre projecting from the tip of the ferrule is then cleaved and polished in the normal way.

Although the use of temperature sensitive materials which change colour at particular temperatures to provide a visual indication of temperature are known, the use of such devices in the present application has never before been proposed and is thought to be inventive. Furthermore, the location of such a pad at a position spaced from a location the temperature of which is to be monitored such that the lower temperature detected by conduction is indicative of a higher temperature at a remote location is thought to involve a further inventive step. In addition the arrangement of the pads at a position where revertion indicates that the temperature at the remote location has cooled to a handleable temperature is thought to constitute yet another inventive step.

Although particular embodiments of the invention have been described and illustrated herein, it is recognised that modifications and variations may readily occur to those skilled in the art, and consequently, it is intended that the claims be interpreted to cover such modifications and equivalents.

We claim:

1. An optical fibre cable terminating tool for terminating a cable to a connector, where the connector has a ferrule provided with a meltable adhesive, the tool has a recess with a recess end, for receiving and locating the connector with an end of the ferrule projecting from the recess end, to permit the ferrule end to be inserted into a heating recess of an oven, comprising:
    a heat sensitive element provided on the tool, which element displays a change in appearance at a predetermined temperature which is indicative of a higher temperature at the ferrule at which higher temperature the adhesive is molten.

2. An optical fibre cable terminating tool as claimed in claim 1, wherein the heat sensitive element has a layer of printing ink and an overlying layer of a thermally sensitive ink which clears to reveal the underlying printing ink layer at said predetermined temperature.

3. An optical fibre cable terminating tool as claimed in claim 2, wherein the underlying layer of printing ink is of a distinctive colour.

4. An optical fibre cable terminating tool as claimed in claim 2, wherein the underlying layer of printing ink forms a distinctive wording or motif.

5. An optical fibre cable terminating tool as claimed in claim 1, in which said predetermined temperature is one which is no greater than about 50° C.

6. An optical fibre cable terminating tool as claimed in claim 5, in which said predetermined temperature is from 45° to 50° C.

7. An optical fibre cable terminating tool as claimed in claim 5, in which the heat sensitive element has a revertive change characteristic such that it reverts to its original appearance when the temperature returns to below said predetermined temperature thereby to indicate that the tool and connector are at temperature at which they can be handled and that the adhesive has set.

8. An optical fibre cable terminating tool as claimed in claim 1, wherein the tool is provided at its recess end with an outwardly projecting flange which serves to permit the projecting ferrule to enter a heating aperture of an oven but prevents the tool from entering and which permits the heated connector and tool combination to be saved in a cooling rack.

9. An optical fibre cable terminating tool as claimed in claim 1, wherein the tool has a body with the recess provided in one end, the end of the recess is open and there are provided a pair of resilient legs extending divergently one on each side of an axis through the centre of the recess, a slider is provided on the legs which cooperates with the divergent surfaces of the legs to cause their extremities to be urged towards each other upon movement of the slider towards the remote end of the legs thereby to permit clamping of a cable between said extremities to secure the cable during cooling of the adhesive.

10. A combination of an optical fibre cable terminating tool and an oven, wherein:
said oven has oven walls forming a heatable chamber, with said oven walls including at least one heating aperture, and said tool includes an elongate body having a forward end and having a recess shaped to receive and locate a connector that has a ferrule with a ferrule end projecting forwardly from the body forward end, with the forward end of the body serving to permit the projecting ferrule end to enter said heating aperture of said oven but which prevents the tool from entering the oven.

11. An optical fibre cable terminating tool comprising an elongate body provided at one end with a through recess shaped to receive and locate a connector, having at one end a ferrule, with the ferrule end projecting from the recess, which body is provided with a pair of resilient legs extending divergently one on each side of an axis through the centre of the recess, a slider provided on the legs which cooperates with the divergent surfaces of the legs to cause their extremities to be urged towards each other upon movement of the slider towards the remote end of the legs thereby to permit clamping of a cable between said extremities.

12. An optical fibre cable terminating tool as claimed in claim 11, wherein the end of the elongate body is substantially cylindrical.

13. An optical fibre cable terminating tool as claimed in claim 12, wherein the body is formed of a resilient material and there are provided a plurality of elongate slots extending from the recess end through the wall of the body to the recess to facilitate flexing of the wall.

14. An optical fibre cable terminating tool as claimed in claim 13 wherein there are four slots disposed equidistantly around the cylindrical end.

15. An optical fibre cable terminating tool as claimed in claim 14, wherein one of the slots is a wider slot which permits the connector to be removed from the recess by radial movement.

16. An optical fibre cable terminating tool as claimed in claim 15, moulded from a plastics material.

17. A method of terminating an end of an optical fibre cable comprising the steps of:
(a) stripping the covering from an end of the cable to expose a fibre for termination,
(b) mounting a connector, having a ferrule containing a meltable adhesive for receipt of an optical fibre, in a recess in a tool such that the ferrule end projects therefrom,
(c) using the tool to insert the ferrule end into a heating aperture of an oven and allowing the ferrule end to be heated,
(d) watching for a change of appearance of a heat sensitive region on the tool, which is responsive to conductive heat, to indicate when the ferrule temperature has exceeded the melting point of the adhesive,
(e) using the tool to remove the ferrule end from the oven,
(f) inserting the stripped optical fibre into the ferrule until the fiber passes substantially completely through the ferrule, and allowing the connector and tool to cool.

18. A method of terminating an optical fibre cable as claimed in claim 17, wherein the connector is allowed to cool until the heat sensitive region reverts to its original appearance prior to removing the connector from the tool.

19. A method of terminating an optical fibre cable as claimed in claim 17, including the step of clamping the cable at a position spaced from the stripped fibre end, after insertion of the fibre into the ferrule, to secure the cable during cooling, and releasing the clamp after cooling to permit removal of the terminated cable from the tool.

* * * * *